United States Patent
Alstad

(10) Patent No.: US 8,231,144 B2
(45) Date of Patent: Jul. 31, 2012

(54) JOINT ASSEMBLIES

(75) Inventor: Shawn Alstad, Peoria, AZ (US)

(73) Assignee: Honeywell International, Inc., Morristown, NJ (US)

( * ) Notice: Subject to any disclaimer, the term of this patent is extended or adjusted under 35 U.S.C. 154(b) by 139 days.

(21) Appl. No.: 12/489,945

(22) Filed: Jun. 23, 2009

(65) Prior Publication Data

US 2010/0320752 A1    Dec. 23, 2010

(51) Int. Cl.
*F16L 27/04* (2006.01)

(52) U.S. Cl. .................. 285/265; 285/264; 285/261

(58) Field of Classification Search .............. 285/265, 285/264, 261, 98, 99, 121.3, 121.6, 121.7, 285/223, 335, 352, 302, 121.2, 272
See application file for complete search history.

(56) References Cited

U.S. PATENT DOCUMENTS

| | | | | |
|---|---|---|---|---|
| 2,286,122 A * | 6/1942 | Stapp | | 285/94 |
| 2,845,283 A * | 7/1958 | Kuhn | | 285/146.2 |
| 3,002,771 A * | 10/1961 | Chakroff | | 285/145.4 |
| 3,306,636 A * | 2/1967 | Hereth | | 285/94 |
| 3,951,418 A * | 4/1976 | Dryer | | 277/619 |
| 4,296,953 A * | 10/1981 | Nagao et al. | | 285/302 |
| 4,317,586 A * | 3/1982 | Campbell | | 285/95 |
| 5,192,094 A * | 3/1993 | Hamamoto | | 285/145.5 |
| 5,286,071 A | 2/1994 | Storage | | |
| 5,897,146 A * | 4/1999 | Saito et al. | | 285/145.3 |
| 6,056,329 A * | 5/2000 | Kitani et al. | | 285/145.3 |
| 6,854,486 B2 * | 2/2005 | Challender | | 138/109 |
| 7,040,666 B2 | 5/2006 | Christianson et al. | | |
| 2004/0245777 A1* | 12/2004 | Vila | | 285/261 |
| 2010/0044972 A1* | 2/2010 | Vila | | 277/612 |

FOREIGN PATENT DOCUMENTS

JP      54058221 A   *   5/1979

\* cited by examiner

*Primary Examiner* — Aaron Dunwoody
(74) *Attorney, Agent, or Firm* — Ingrassia Fisher & Lorenz, P.C.

(57) ABSTRACT

A joint assembly for coupling a first conduit to a second conduit includes a first collar configured to be mounted on the first conduit and a second collar configured to be mounted on the second conduit. The second collar may have a central longitudinal axis that is generally aligned with a z-axis. An inner bushing may be coupled to the first collar and have a generally convex surface, and an outer bushing may be coupled to the second collar and have a generally concave surface. The generally convex surface and the generally concave surface may mate with one another and be configured for relative movement such that the first collar gimbals in an xy-plane.

17 Claims, 3 Drawing Sheets

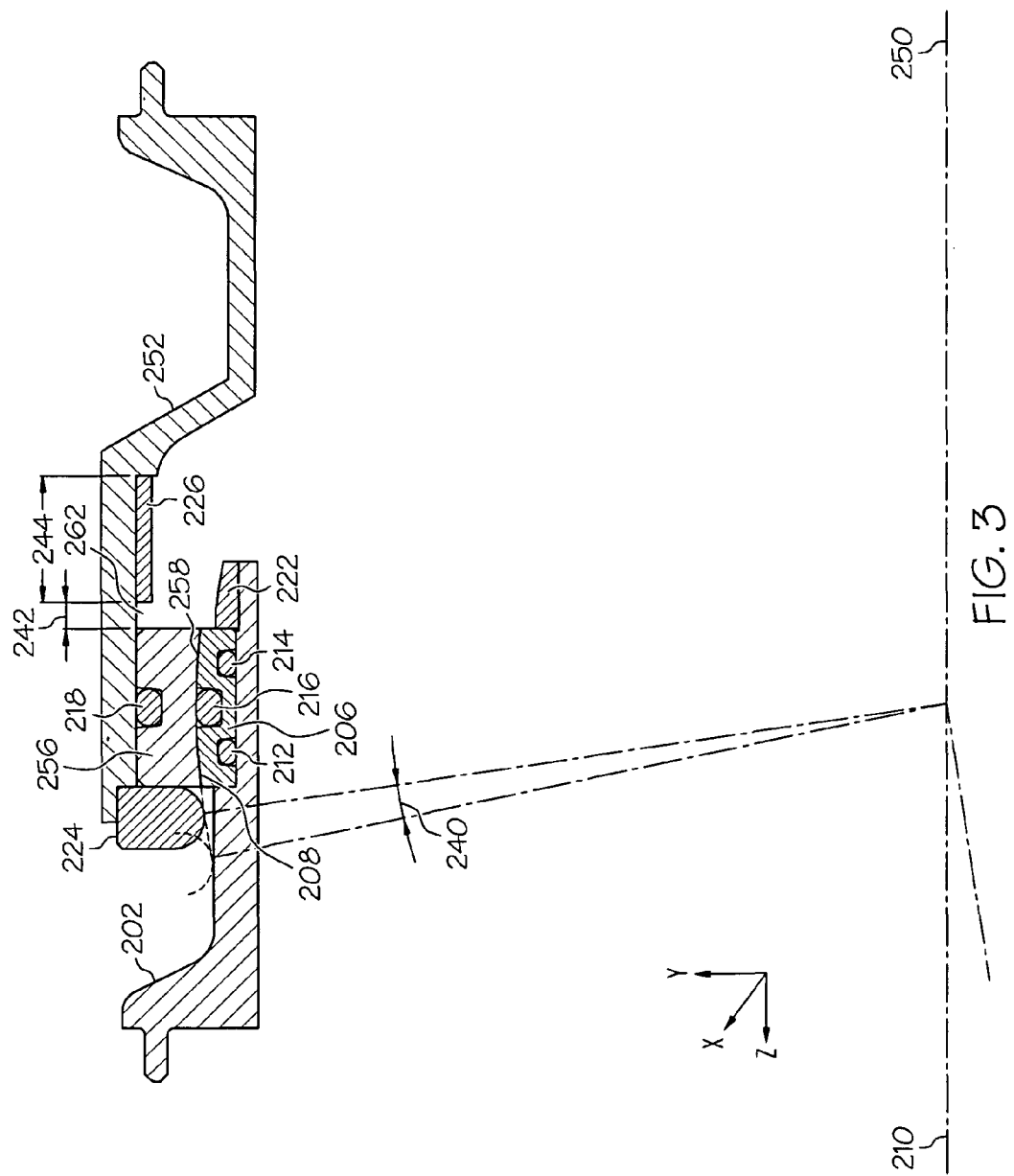

JOINT ASSEMBLIES

TECHNICAL FIELD

The present invention generally relates to joint assemblies of duct systems, and more particularly relates to gimbal joints used to flexibly connect sections of duct systems.

BACKGROUND

Gas turbine engines produce air that may be ducted for use in various parts of the engine and/or external applications, for example, in other portions of an aircraft. Duct systems typically include flexible joint assemblies to accommodate irregular internal passages, hardware, and machinery. These joint assemblies also provide flexibility during installation and operation. During operation, high temperature and pressure fluctuations and acceleration and deceleration forces may result in stresses on the duct sections and joint assemblies.

Conventional joint assemblies may have some disadvantages. For example, some conventional joint assemblies may not be able to sufficiently accommodate stresses within the duct system. Particularly, operating stresses such as those occurring during hard landings may be an issue. Gimbal joint assemblies allow some movement to accommodate the stresses. However, most conventional gimbal joint assemblies only allow limited movement in a limited number of directions, which may not sufficiently accommodate stresses and/or transfer the stresses to other, undesirable portions of the aircraft. Some designers may attempt to overdesign the components of the duct system to react out excessive stresses, but this results in a heavier, more complex, more expensive, and less efficient engine and aircraft designs. In effect, these types of systems may only transfer the loads to undesired portions of the aircraft instead of accommodating the stresses in the appropriate location.

Accordingly, it is desirable to provided improved joint assemblies that more advantageously accommodate stresses within the duct system. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a joint assembly for coupling a first conduit to a second conduit includes a first collar configured to be mounted on the first conduit and a second collar configured to be mounted on the second conduit. The second collar may have a central longitudinal axis that is generally aligned with a z-axis. An inner bushing may be coupled to the first collar and have a generally convex surface, and an outer bushing may be coupled to the second collar and have a generally concave surface. The generally convex surface and the generally concave surface may mate with one another and be configured for relative movement such that the first collar gimbals in an xy-plane.

In accordance with another exemplary embodiment, a method is provided for assembling a joint assembly on first and second duct sections of a duct assembly. The method includes coupling a first collar to the first duct section; arranging an inner bushing on the first collar, the inner bushing having a convex surface; arranging an outer bushing on the second collar, the outer bushing having a concave surface that mates with the convex surface of the inner bushing; and coupling a second collar to the outer bushing and the second duct section, the second collar configured to gimbal with the outer bushing relative to the inner bushing and the first collar.

BRIEF DESCRIPTION OF THE DRAWINGS

The present invention will hereinafter be described in conjunction with the following drawing figures, wherein like numerals denote like elements, and wherein:

FIG. 3 is a partial, cross-sectional side view of the joint assembly of FIG. 2.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include improved joint assemblies for duct systems. The joint assemblies may include spherical bushings that enable gimballing in two directions. The joint assemblies may additionally translate along and rotate about a longitudinal axis. Gimbal control collars and slide collars may be provided to limit and/or control gimballing and translation, respectively.

Figure 1:
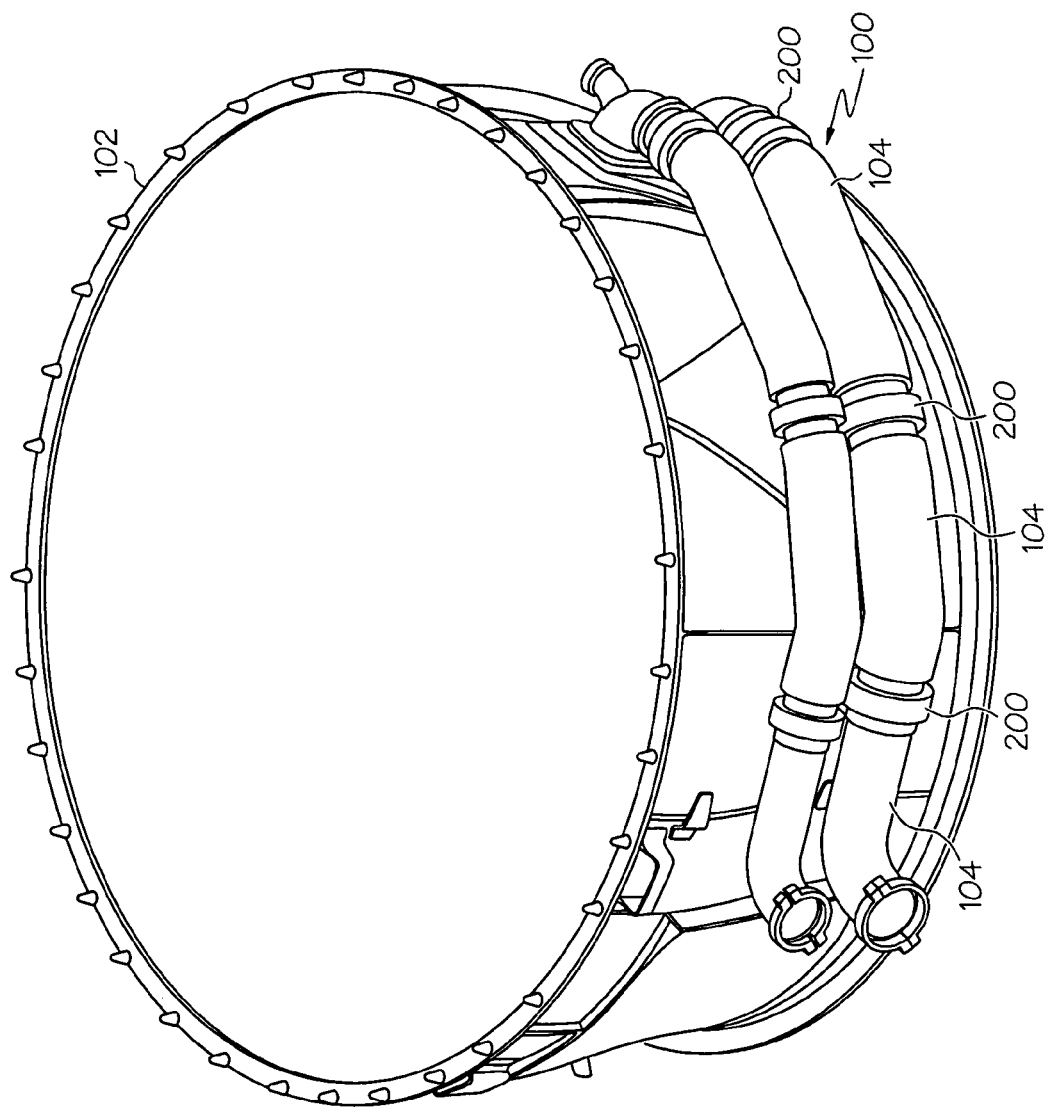
FIG. 1 is a partial, isometric view of a duct system with joint assemblies in accordance with an exemplary embodiment.

FIG. 1 is a partial isometric view of a duct system 100 with joint assemblies 200 in accordance with an exemplary embodiment. Typically, the duct system 100 is associated with a gas turbine engine 102. The gas turbine engine 102 may produce air that is ducted by the duct system 100 for use in various parts of the engine and/or other external applications. The duct system 100 may be used, for example, in an aircraft (not shown). The duct system 100 may transfer either high pressure or low pressure air, for example, to power various pneumatic valves and controls. The duct system 100 may form part of a customer bleed system, environmental control system, engine bleed system, HAVAC system, or the like.

The duct system 100 typically includes one or more duct sections 104 or other types of conduits joined together with one or more joint assemblies 200. Any number of joint assemblies 200 may be provided and do not have to be identical. In general, operational or external forces may cause one or more of the duct sections 104 to move and create stresses within the duct system 100. The joint assemblies 200 accommodate these stresses to prevent them from being transferred through the duct system 100 and to the gas turbine engine 102 or the aircraft (not shown). A hard landing of the aircraft may be one example of an external stress that could be accommodated by the joint assemblies 200.

Figure 2:
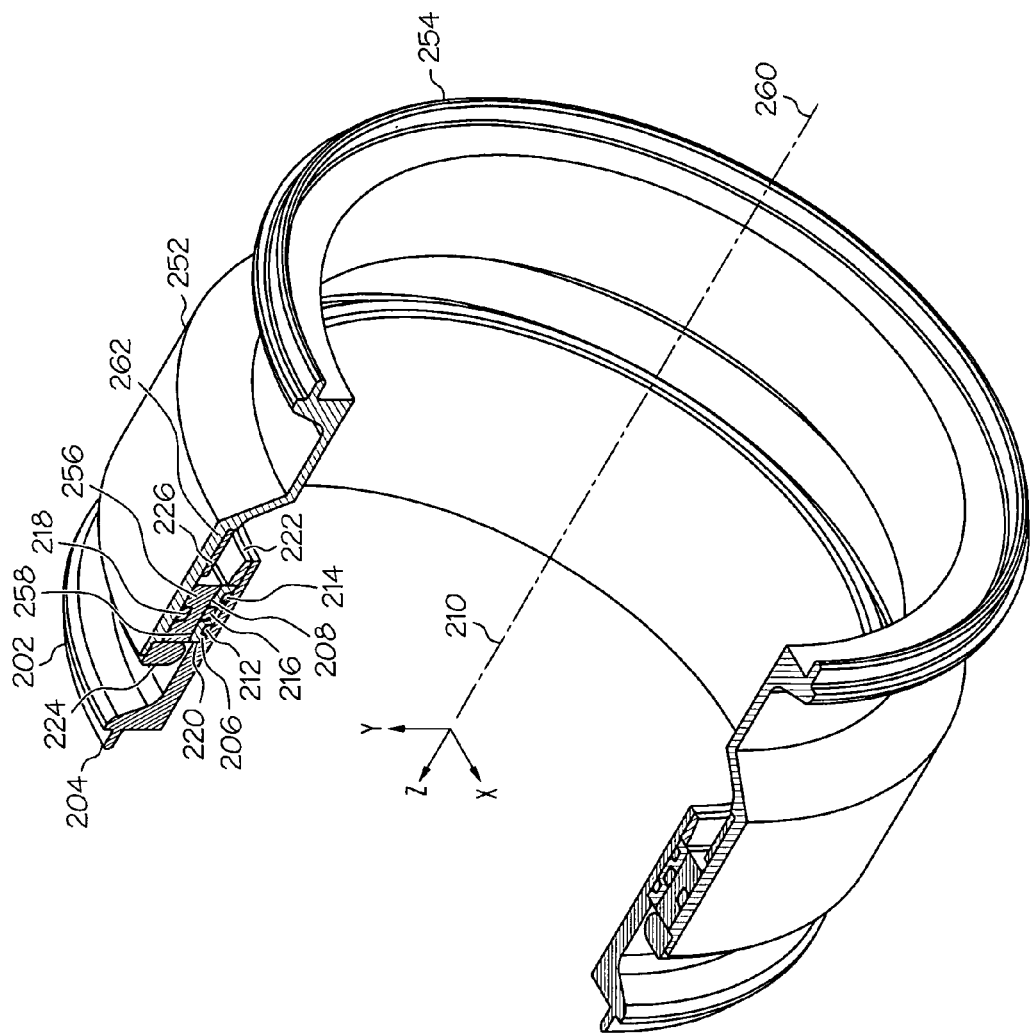
FIG. 2 is a cross-sectional, isometric view of one of the joint assemblies of FIG. 1.

FIG. 2 is a cross-sectional, isometric view of one of the joint assemblies 200 of FIG. 1 in accordance with an exemplary embodiment. The joint assembly 200 includes a first collar 202 configured to be coupled to one of the duct sections 104 (FIG. 1), and a second collar 252 configured to be coupled to an adjacent duct section 104 (FIG. 1). As noted above, the joint assembly 200 enables relative movement between the respective duct sections 104 (FIG. 1). The first and second collars 202, 252 may have flanges 204, 254 to facilitate installation.

The joint assembly 200 includes an inner bushing 206 mounted on, and circumscribing, the first collar 202. The joint assembly 200 further includes an outer bushing 256 mounted within the second collar 252 and circumscribing the inner bushing 206. The inner bushing 206 is typically fixed to and moves with the first collar 202, while as discussed in greater detail below, in some instances, the outer bushing 256 may move relative the second collar 252.

As will be discussed in greater detail with reference to FIG. 3, the inner bushing 206 has a convex or spherical outer surface 208 and the outer bushing 256 has a concave or spherical inner surface 258. The convex outer surface 208 and concave inner surface 258 mate to enable gimballing or relative movement of the first and second collars 202, 252 in the xy-plane. In other words, during equilibrium, the first and second collar 202, 252 typically have longitudinal axis 210, 260 that are aligned with each other and the z-axis of FIG. 2. However, during gimballing, the first collar 202 has a longitudinal axis 210 that is offset with respect to a longitudinal axis 260 of the second collar 252. Additionally, the convex outer surface 208 and the concave inner surface 258 are configured to enable relative rotation between the first and second collars 202, 252 about the z-axis. In one exemplary embodiment, the first and second collars 202, 252 may have unlimited rotation with respect to one another.

A number of O-rings 212, 214, 216, 218 are provided to seal the joint assembly 200, particularly during high pressure applications. For example, first and second O-rings 212, 214 are arranged in slots in the inner bushing 206 to form a seal between the inner bushing 206 and the first collar 202. A third O-ring 216 is arranged in a slot in the inner bushing 206 to form a seal between the inner bushing 206 and the outer bushings 256. A fourth O-ring 218 is arranged in a slot in the outer bushing 256 to form a seal between the outer bushing 256 and the second collar 252. In some applications, the O-rings 212, 214, 216, 218 can be omitted, particularly during low pressure applications. In further embodiments, one or more of the O-rings 212, 214, 216, 218 may be replaced with a metal ring. These metal rings may be split such that they can be assembled within the grooves of the joint assembly 200. In some instances, the metal rings may be cylindrical, while in other instances an external surface of the ring may be convex to match the shape of the appropriate groove. The metal rings may be used, for example, in high temperature and pressure environments.

The inner bushing 206 is fixed to the first collar 202 on one side by a step 220 formed in the first collar 202 and on the other side by a jam collar 222. The jam collar 222 is installed after the inner bushing 206 and may be fixedly attached to the first collar 202. For example, the first collar 202 may have screw threads that match corresponding screw threads on the inner surface of the jam collar 222 to fix the jam collar 222 to the first collar 202.

As noted above, the joint assembly 200 gimbals in the xy-plane. In one exemplary embodiment, a gimbal control collar 224 may be mounted on the second collar 252. For example, the gimbal control collar 224 may have screw threads that match corresponding screw threads on the second collar 252 to fix the gimbal control collar 224 to the second collar 252. As discussed in greater detail below, the gimbal control collar 224 is sized to limit the extent of gimballing by the first and second collars 202, 252. In other exemplary embodiments, the gimbal control collar 224 may be omitted.

As also noted above, the joint assembly 200 translates along the z-axis. Particularly, in some exemplary embodiments, the second collar 252 may include a cavity 262 that allows the outer bushing 256, along with the inner bushing 206 and the first collar 202, to translate relative the second collar 252. As such, the outer bushing 256 slides along the second collar 252 within the cavity 262 such that the first collar 202 moves generally along the z-axis relative to the second collar 252. The joint assembly 200 may further include a slide collar 226 mounted within the cavity 262 to limit the extent of translation. In some embodiments, the slide collar 226 may be omitted.

In general, the inner and outer bushings 206, 256 may be assembled by press fitting. In other embodiments, the inner and outer bushings 206, 256 may be assembled by cooling the inner bushing 206 such that the outer bushing 256 may be slipped over the inner bushing 206.

FIG. 3 is a partial, cross-sectional side view of the joint assembly 200 of FIG. 2 and more clearly shows the extent of relative movement between the first collar 202 and the second collar 252. Particularly, FIG. 3 illustrates the convex outer surface 208 of the inner bushing 206 mating with the concave inner surface 258 of the outer bushing 256 such that the first collar 202 can gimbal with respect to the second collar 252 within the xy-plane.

As described above, the joint assembly 200 includes the gimbal control collar 224 mounted on the second collar 252 adjacent to the outer bushing 256. During equilibrium, the gimbal control collar 224 is offset from the first collar 202. During gimballing, the gimbal control collar 224 contacts the first collar 202, as indicated by the dashed lines in FIG. 2, and limits a gimbal angle 240. As such, the size of the gimbal control collar 224 may be manipulated to dictate the extent of gimballing and the gimbal angle 240. A smaller gimbal control collar 224 enables a larger gimbal angle 240, and a larger gimbal control collar 224 enables a smaller gimbal angle 240.

As described above, the joint assembly 200 includes the slide collar 226 mounted within the cavity 262 of the second collar 252. During equilibrium, the slide collar 226 is offset from the inner bushing 206 such that the outer bushing 256 can slide within the cavity 262 and enable the first collar 202 to translate relative to the second collar 252 along the z-axis. In the embodiment of FIG. 3, the outer bushing 256 can slide within the cavity 262 at a distance 242, which is controlled by the length 244 of the slide collar 262. A longer slide collar 226 enables a shorter sliding distance 242, and a shorter slide collar 226 enables a longer sliding distance 242.

Accordingly, the joint assembly 200 may be used to accommodate stresses within the duct system 100 (FIG. 1), for example, on an aircraft. Exemplary embodiments of joint assembly 200 enable gimballing within an xy-plane, translation along a z-axis, and rotation about the z-axis. Additionally, one or more collars 224, 226 may be provided to limit or eliminate gimballing and/or translation. In particular, one joint assembly 200 may have one or both of the collars 224, 226, while another joint assembly 200 may omit one or both of the collars 224, 226. This enables a designer to add flexibility or rigidity to an overall duct system 100 (FIG. 1) as necessary. The various components of the joint assembly 200 may be machined from such material as INCONEL, stainless steel, aluminum alloys, tooling steel, and the like. With one or more of the O-rings 212, 214, 216, 218 (FIG. 2), the joint assembly 200 may withstand temperatures in excess of 850° F. and pressures in excess of 1000 psi.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A joint assembly for coupling a first conduit to a second conduit, comprising:
    a first collar configured to be mounted on the first conduit;
    a second collar configured to be mounted on the second conduit, the second collar having a central longitudinal axis that is generally aligned with a z-axis, wherein the second collar defines an inner cavity that enables movement along the central longitudinal axis between the first collar and the second collar;
    an inner bushing coupled to the first collar and having a generally convex surface; and
    an outer bushing coupled to the second collar and having a generally concave surface, the generally convex surface and the generally concave surface mating with one another and configured for relative movement such that the first collar gimbals in an xy-plane, wherein the outer bushing is configured to slide within the inner cavity relative to the second collar,
    further comprising a first O-ring between the inner bushing and the first collar.

2. The joint assembly of claim 1, further comprising a slide control collar arranged in the inner cavity to limit the movement along the central longitudinal axis.

3. The joint assembly of claim 1, further comprising a gimbal control collar arranged on the second collar adjacent to the outer bushing.

4. The joint assembly of claim 3, wherein the gimbal control collar is configured to limit gimballing in the xy-plane.

5. The joint assembly of claim 4, wherein the gimbal control collar has a height, and first collar is configured to gimbal in the xy-plane relative to the second collar to an angular extent based on the height of the gimbal control collar.

6. The joint assembly of claim 1, further comprising a jam collar adjacent to inner bushing and configured to fix the inner bushing on the first collar.

7. The joint assembly of claim 1, further comprising a first second O-ring between the outer bushing and the second collar.

8. The joint assembly of claim 1, further comprising a second O-ring between the outer bushing and the inner bushing.

9. The joint assembly of claim 1, wherein the inner and outer bushings are configured for movement relative to one another such that the first collar rotates about the central longitudinal axis.

10. The joint assembly of claim 1, wherein the inner bushing and the outer bushing cooperate to maintain a separation between the first collar and the second collar during the movement along the central longitudinal axis and during gimaballing in the xy-plane.

11. The joint assembly of claim 1, wherein the cavity has a slide distance defined on a first side by a side wall of the outer bushing and on a second side by second collar.

12. The joint assembly of claim 11, further comprising a slide control collar positioned within the inner cavity between the side wall of the outer bushing and the second collar to limit the movement along the central longitudinal axis.

13. The joint assembly of claim 12, wherein the outer bushing has a first position in the inner cavity separated from the slide control collar and a second position in the inner cavity abutting the slide control collar such that the outer busing is configured to slide between the first position and the second position.

14. The joint assembly of claim 1, wherein the inner bushing, the outer bushing, and the second collar are configured such that the movement along the central longitudinal axis is independent of gimballing in the xy-plane.

15. A method of assembling a joint assembly on first and second duct sections of a duct assembly, the method comprising the steps of:
    coupling a first collar to the first duct section;
    arranging an inner bushing on the first collar, the inner bushing having a convex surface;
    arranging an outer bushing on the second collar, the outer bushing having a concave surface that mates with the convex surface of the inner bushing; and
    coupling a second collar to the outer bushing and the second duct section, the second collar configured to gimbal with the outer bushing relative to the inner bushing and the first collar, wherein the coupling the second collar step includes coupling the second collar such that the outer bushing is configured to translate along a longitudinal axis within a cavity of the second collar;
    arranging a slide control collar in the inner cavity to limit the movement of the outer bushing within the inner cavity; and
    coupling a gimbal control collar to the second collar by mating corresponding screw threads on the gimbal control collar and the second collar, the gimbal control collar configured to limit gimballing of the inner bushing and second collar relative to the outer bushing and the first collar.

16. The method of claim 15, further comprising coupling a jam collar adjacent to inner bushing to fix the inner bushing on the first collar.

17. A joint assembly for coupling a first conduit to a second conduit, comprising:
    a first collar configured to be mounted on the first conduit;
    a second collar configured to be mounted on the second conduit, the second collar having a central longitudinal axis that is generally aligned with a z-axis, the second collar defining an inner cavity;
    an inner bushing coupled to the first collar and having a generally convex surface; and
    an outer bushing coupled to the second collar and having a generally concave surface, the generally convex surface and the generally concave surface mating with one another and configured for relative movement such that the first collar gimbals in an xy-plane, the outer bushing being configured to slide within the inner cavity relative to the second collar to enable movement along the central longitudinal axis between the first collar and the second collar;
    a slide control collar arranged in the inner cavity to limit the movement along the central longitudinal axis;
    a gimbal control collar arranged on the second collar adjacent to the outer bushing, the gimbal control collar configured to limit gimballing in the xy-plane; and
    a jam collar mounted on the inner bushing with screw threads, the jam collar configured to fix the inner bushing on the first collar.

* * * * *